US008094194B2

(12) United States Patent
Lee

(10) Patent No.: US 8,094,194 B2
(45) Date of Patent: Jan. 10, 2012

(54) DISPLAY APPARATUS AND CONTROL METHOD THEREOF

(75) Inventor: Sung-tae Lee, Yongin-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1281 days.

(21) Appl. No.: 11/610,067

(22) Filed: Dec. 13, 2006

(65) Prior Publication Data

US 2007/0146237 A1 Jun. 28, 2007

(30) Foreign Application Priority Data

Dec. 27, 2005 (KR) ........................ 10-2005-0130792

(51) Int. Cl.
*H04N 3/20* (2006.01)
*H04N 5/21* (2006.01)

(52) U.S. Cl. ........ 348/173; 348/615; 348/569; 348/607; 348/739; 345/618; 345/214

(58) Field of Classification Search .................. 348/173, 348/569, 553, 607, 615, 559, 558, 739; 345/618, 345/42, 214; 715/716, 798
See application file for complete search history.

(56) References Cited

U.S. PATENT DOCUMENTS 6,473,077 B1 10/2002 Takenaka et al.
7,102,694 B2 * 9/2006 Jang .............................. 348/607
7,403,194 B2 * 7/2008 Gu ................................ 345/204
7,474,356 B2 * 1/2009 Lee ............................... 348/569
2002/0084959 A1 7/2002 Park et al.
2003/0071769 A1 4/2003 Sullivan et al.
2004/0135768 A1 7/2004 Gu
2005/0275644 A1 12/2005 Shen et al.

FOREIGN PATENT DOCUMENTS

| | | |
|---|---|---|
| CN | 1251932 | 5/2000 |
| CN | 1413015 | 4/2003 |
| EP | 1227460 | 7/2002 |
| JP | 05-167874 | 7/1993 |
| JP | 2000-39867 | 2/2000 |
| KR | 2004-58445 | 7/2004 |
| KR | 2004-103155 | 12/2004 |

OTHER PUBLICATIONS

Chinese Office Action dated May 16, 2008 issued in CN 2006-10172363.9.

(Continued)

*Primary Examiner* — Jefferey Harold
*Assistant Examiner* — Jean W Desir
(74) *Attorney, Agent, or Firm* — Stanzione & Kim, LLP

(57) ABSTRACT

A display apparatus having a displaying part, includes a video processing part to process an input video signal into a format which can be displayed on the displaying part, and a controlling part to determine whether a video image displayed on the displaying part is a still image, and if it is determined that the video image is the still image, to control the video processing part to display the video image according to the input video signal and a predetermined after-image prevention image alternately on the displaying part. Thus, the present general inventive concept provides a display apparatus which is capable of removing an after-image effect occurring in a display panel effectively, and a control method thereof.

28 Claims, 5 Drawing Sheets

OTHER PUBLICATIONS

European Search Report issued Jul. 2, 2010 in EP Application No. 06077226.6.

Chinese Office Action issued Aug. 7, 2009 in CN Application No. 2006101723639.

European Office Action issued May 2, 2011 in EP Application 06077226.6.

European Search Report issued May 2, 2011 in EP Application No. 06077226.6.

* cited by examiner

DISPLAY APPARATUS AND CONTROL METHOD THEREOF

CROSS-REFERENCE TO RELATED APPLICATIONS

This application claims the priority under 35 U.S.C. 119§ (a) from Korean Patent Application No. 2005-0130792, filed on Dec. 27, 2005, in the Korean Intellectual Property Office, the disclosure of which is incorporated herein in its entirety by reference.

BACKGROUND OF THE INVENTION

1. Field of the Invention

The present general inventive concept relates to a display apparatus and a control method thereof, and more particularly, to a display apparatus which is capable of effectively preventing a residual image effect (i.e., after-image effect) occurring in a display panel, and a control method thereof.

2. Description of the Related Art

A conventional CRT (Cathode Ray Tube) has problems such as heaviness, thickness and high power consumption. In recent years, the CRT has been replaced with a flat display apparatus adopting an active matrix driving system.

The flat display apparatus adopting the active matrix driving system displays images by adjusting light transmittance of liquid crystal using thin film transistors (TFTs) as switching elements. Such liquid crystal display apparatuses are being widely used for PC monitors and televisions. However, both a PC monitor and a television often display the same image, i.e., a still image, for prolonged periods of time.

In the above-mentioned display apparatuses, if the still image holds and lasts for too long a time period, there may occur an after-image between a bright portion and a dark portion of the still image due to abrasion of fluorescent substance coated on a partition wall of a cell. In addition, when the still image changes to a different image after lasting for a long time period, an after-image of the still image is left due to a low speed response to a video signal. The after-image deteriorates image quality of the display apparatuses, resulting in consumer dissatisfaction.

SUMMARY OF THE INVENTION

The present general inventive concept provides a display apparatus which is capable of removing an after-image effect occurring in a display panel effectively, and a control method thereof.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a display apparatus having a displaying part, comprising a video processing part to process an input video signal into a format which can be displayed on the displaying part, and a controlling part to determine whether a video image displayed on the displaying part is a still image, and if it is determined that the video image is the still image, to control the video processing part to display the video image according to the input video signal and a after-image prevention image alternately on the displaying part.

The controlling part may control the video processing part to alternate between an operation of outputting video frames according to the input video signal to the displaying part and an operation of outputting an after-image prevention frame corresponding to the after-image prevention image to the displaying part.

The controlling part may comprise an image sensor to sense whether the video image displayed on the displaying part is stationary, and a microcomputer may determine that the displayed video image is the still image that is stationary for more than a predetermined period of time, based on a result of the sensing of the image sensor.

The video processing part may comprise a frame buffer to store the video signal to be provided to the displaying part in a unit of frame, and the image sensor makes a comparison between video frames sequentially stored in the frame buffer and outputs a result of comparison between the displayed video image and a previous video image, as a sensing signal.

The microcomputer may determine that the displayed video image is the still image if the predetermined period of time elapses under a condition where a ratio of a stationary area of the displayed video image to an overall area of the previous video image exceeds a predetermined ratio.

The microcomputer may also determine that the displayed video image is the still image if, based on the sensing signal from the image sensor, the predetermined period of time elapses under a condition where a predetermined area of the previous video image has the same data values as an area of the displayed video image which corresponds to the predetermined area.

The video processing part may also comprise a video signal processor to support a display system having a predetermined vertical frequency, and to sequentially and repeatedly perform operations of processing the input video signal into a format which can be displayed on the displaying part according to the predetermined vertical frequency, storing the processed video signal in the frame buffer in the unit of frame, reading stored video frames from the frame buffer, and outputting the read video frames to the displaying part.

The video signal processor may also comprise a pattern generator to generate the after-image prevention frame corresponding to the after-image prevention image, and to repeatedly perform an operation of alternately outputting one of an odd-numbered video frame and an even-numbered video frame of the video frames sequentially stored in the frame buffer and the after-image prevention frame generated in the pattern generator to the displaying part.

The display apparatus may also comprise an after-image removal function selecting part to set at least one of on state and off-state of an after-image removal function, wherein the controlling part stores at least one of on setting state and off setting state of the after-image removal function that is selected through the after-image removal function selecting part, and, if the after-image removal function is set to be in the on-state, determines whether the video image displayed on the displaying part is stationary.

The after-image prevention image may be a black image.

The predetermined vertical frequency may be 120 Hz.

The foregoing and/or other aspects and utilities of the present general inventive concept may also be achieved by providing a control method of a display apparatus having a displaying part, comprising displaying a video image according to an input video signal on the displaying part, determining whether the displayed video image is a still image, and displaying the video image according to the input video signal and a predetermined after-image prevention image alternately on the displaying part when the displayed video image is a still image.

The displaying of the video image and the after-image prevention image may alternately comprise outputting alternately between an operation of outputting video frames according to the input video signal to the displaying part, and an operation of outputting an after-image prevention frame corresponding to the after-image prevention image to the displaying part.

The displaying of the video image according to the input video signal on the displaying part may comprise sequentially and repeatedly performing operations of processing the input video signal into a format which can be displayed on the displaying part, storing the processed video signal in a frame buffer in the unit of frame, reading stored video frames from the frame buffer, and outputting the read video frames to the displaying part.

The determining of whether the displayed video image is the still image may comprise comparing the displayed video image with a previous video image based on the video frames sequentially stored in the frame buffer.

The displaying of the video image and the after-image prevention image may alternately comprise outputting alternately between an operation of outputting one of an odd-numbered video frame and an even-numbered video frame of the video frames sequentially stored in the frame buffer to the displaying part, and an operation of outputting the after-image prevention frame corresponding to the after-image prevention image to the displaying part one time.

The after-image prevention image may be a black image.

The control method may further comprise receiving at least one of on set value and offset value of the after-image removal function, wherein the determining of whether the displayed video image is the still image comprises determining whether the displayed video image is stationary, if the after-image removal function is set to be in an on-state, based on the received on/off-set value.

The foregoing and/or other aspects and utilities of the present general inventive concept may also be achieved by providing a display apparatus having a displaying part, comprising a controlling part to compare video frames and to determine that a displayed video image is a still image according to the compared video frames, and a video processing part to display an after-image prevention image between the video frames according to the determination of the controlling part on the displaying part.

The video frames may comprise a first frame and a second frame, and the controlling part may control the video processing part to output the after-image prevention image and one of the first frame and the second frame as a video image to be displayed.

The controlling part may determine the still image if a ratio of a stationary area of the displayed video image to an overall area of the previous video image exceeds a reference.

The foregoing and/or other aspects and utilities of the present general inventive concept may also be achieved by providing a method of determining a displayed image on a display apparatus is stationary to prevent an after-image effect, comprising comparing video frames to generate a sensing signal, determining that a displayed video image is a still image, and outputting an after-image prevention image according to the determination.

The after-image prevention image may comprise a black video image.

The determining of the still image may comprise determining whether a ratio of the stationary area of the current video image to the overall area of the previous video image exceeds a reference after a predetermined period of time.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
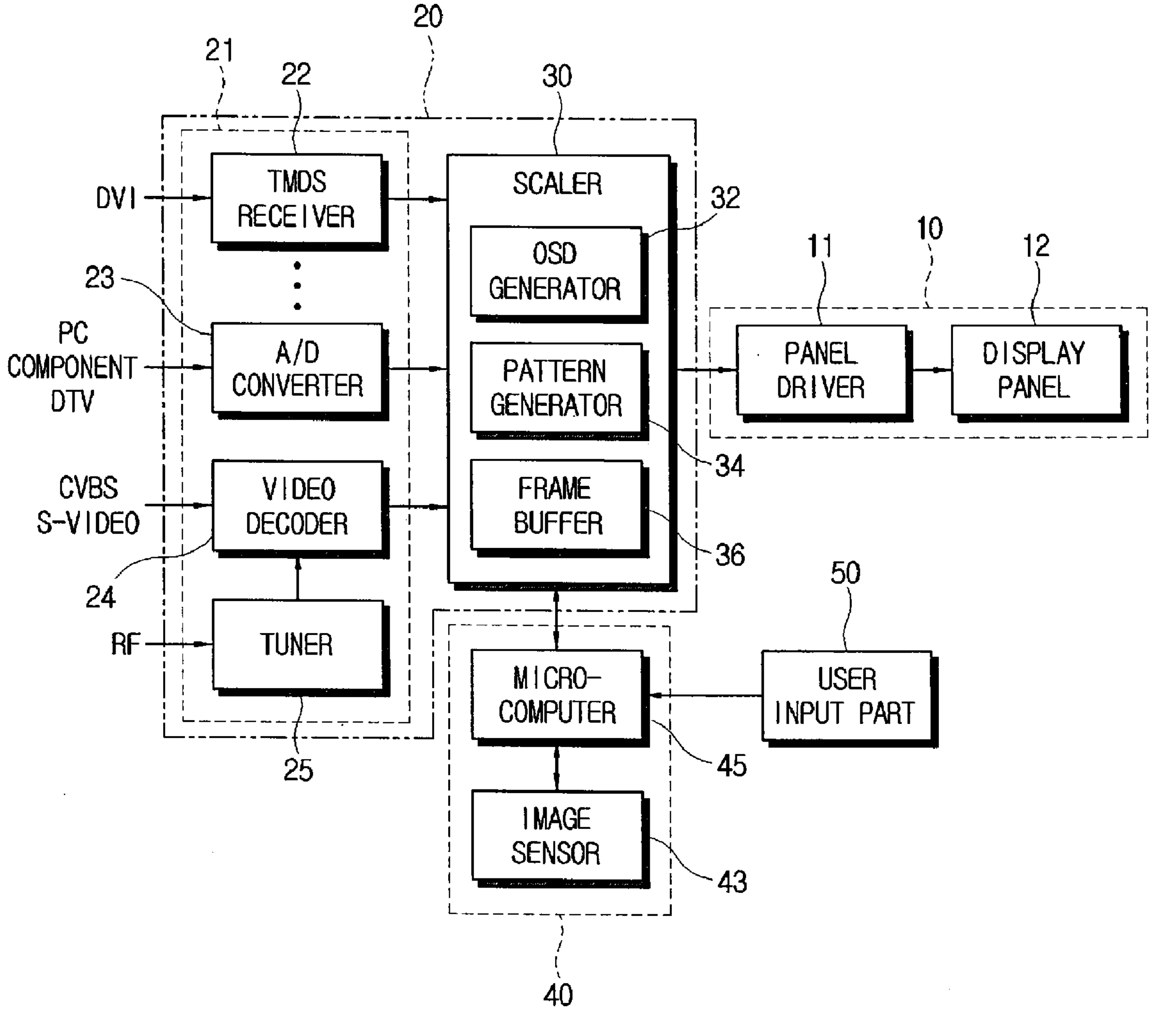
FIG. 1 is a control block diagram illustrating a display apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Referring to FIG. 1, a display apparatus according to an embodiment of the present general inventive concept comprises a displaying part 10, a video processing part 20, a controlling part 40 and a user input part 50.

The displaying part 10 receives a video signal from the video processing part 20 and displays an image based on the video signal. The displaying part 10 comprises a display panel 12 on which the image is displayed, and a panel driver 11 to process the video signal input from the video processing part 20, and to display the image on the display panel 12. The display panel 12 of the present general inventive concept may be an LCD (Liquid Crystal Display) panel using thin film transistors (TFTs) as switching elements, or a PDP (Plasma Display Panel). Although this embodiment illustrates that the display panel 12 is the LCD panel or the PDP panel, the display panel 12 may be any type of display device other than the LCD panel and the PDP panel in which an after-image effect may occur if a still image lasts for a certain time.

The video processing part 20 includes a scaler 30 provided as a video signal processor to scale the video signal and a signal converting part 21 to convert the video signal input thereto into a video signal which can be processed by the scaler 30. The signal converting part 21 may include a TMDS (Transition Minimized Differential Signaling) receiver 22, an A/D converter 23, a video decoder 24, a tuner (25), etc.

The TMDS receiver 22 separates a digital video signal such as a DVI signal input from the outside through a digital connecting terminal (not illustrated) into an RGB digital signal and an H/V synchronization signal, which are then output to the scaler 30. The A/D converter 23 converts an analog video signal input thereto, such a component signal or a PC signal, into a digital video signal and outputs the digital video signal to the scaler 30. The video decoder 24 decodes an analog video signal, such as a CVBS (Composite Video Baseband Signal) or an S-video signal, is input through an analog connecting terminal, and outputs the decoded analog video signal to the scaler 30. The tuner 25 receives a broadcasting signal as an RF signal input through an antenna (not illustrated) or the like, and outputs the received broadcasting signal to the video decoder 24.

The scaler 30 scales the video signal input from the signal converting part 21 to a format that can be displayed on the display panel 12, and outputs the scaled video signal to the panel driver 11. The scaler 30 includes a frame buffer 36. Accordingly, when a moving picture according to the input video signal is to be displayed on the display panel 12, the scaler 30 sequentially and repeatedly performs operations of storing the video signal input from the signal converting part 21 in the frame buffer 36 in a unit of a frame, reading the stored video frames from the frame buffer 36, and then outputting the read video frames to the panel driver 11. Then, the panel driver 11 displays a video image according to the video frames sequentially and repeatedly input from the scaler 30 on the display panel 12 so that the moving picture according to the video signal input from the signal converting part 21 is displayed on the display panel 12.

The number of video frames to be displayed on the display panel 12 for one second varies depending on a vertical frequency of the video signal provided from the scaler 30 to the panel driver 11. For example, when a video signal having a vertical frequency of 120 Hz is input from the outside to the video processing part 20, the scaler 30 sequentially and repeatedly performs the operations of storing video frames according to the video signal of a vertical frequency of 120 Hz in the frame buffer 36 in the unit of a frame, reading the stored video frames from the frame buffer 36, and then outputting the read video frames to the panel driver 11 120 times for one second. Accordingly, a moving picture is sequentially displayed on the display panel 12 as a video image corresponding to 120 video frames for one second. In a similar manner, when a video signal having a vertical frequency of 60 Hz is input from the outside to the video processing part 20, a moving picture will be sequentially displayed on the display panel 12 as a video image corresponding to 60 video frames for one second.

The video processing part 20 may further include a motion compensator (not illustrated) to insert compensating frames to perform motion compensation between video frames of the input video signal, respectively, in order to lessen a motion blur effect of a moving picture according to the input video signal. This motion compensator may be a well known functional unit commonly used in the art. When the video processing part 20 includes the motion compensator, and if a video signal having a vertical frequency of 60 Hz is input from the outside to the video processing part 20, the insertion of the compensating frames may change the vertical frequency of the video signal provided to the panel driver 11 from 60 Hz to 120 Hz.

The scaler 30 includes a pattern generator 34 to generate after-image prevention frames corresponding to after-image prevention images. The pattern generator 34 generates video frames to display at least one of white, red, green, blue and black images on the display panel 12. The pattern generator 34 may also generate the black image as an after-image prevention image. While the embodiment of FIG. 1 illustrates that the pattern generator 34 is included in the scaler 30, this is not a limitation of the general inventive concept. For example, the scaler 30 may be programmed to generate after-image images without the pattern generator 34, or the pattern generator 34 may be provided as a separate functional part without inclusion in the scaler 30.

The scaler 30 performs an operation of displaying a video image according to the input video signal on the display panel 12 under control of the controlling part 40. While under control of the controlling part 40, the scaler 30 may also perform other operations of controlling the pattern generator 34 to generate an after-image prevention frame and displaying the video image according to the input video signal and the after-image prevention frame generated in the pattern generator 34 on the display panel 12 alternately. That is, under control of the controlling part 40, the scaler 30 may alternate between an operation of outputting a video frame according to the input video signal to the panel driver 11 by the predetermined number of times and an operation of outputting an after-image prevention frame corresponding to the after-image prevention image to the panel driver 11 by the predetermined number of times.

The scaler 30 may also include an OSD (On Screen Display) generator 32 as a UI (User Interface) generator to provide a user with a user UI menu for user's operation.

The user input part 50 is provided as an after-image removal function selecting part to set an after-image removal function on and/or off. The user input part 50 outputs a key signal to the controlling part 40 according to a user's operation. The user input part 50 may include a toggle key to set the after-image removal function on and/or off. The user input part 50 may include buttons provided in a front portion of the display apparatus, separate input means connected to the display apparatus, for example, a mouse (not illustrated), a keyboard (not illustrated), etc., or a wireless remote controller. When the user operates a key, the user input part 50 generates a key signal in response to the key operation and applies the key signal to the controlling part 40. Then, the controlling part 40 may control the video processing part 20 in response to the key signal input from the user input part 50.

The controlling part 40 includes a microcomputer 45 and an image sensor 43.

The image sensor 43 sends the microcomputer 45 a sensing signal to determine whether or not an image displayed on the display panel 12 is stationary, that is, the same image is displayed on the display panel 12. The image sensor 43 makes a comparison between video frames sequentially stored in the frame buffer 36 and outputs a result of the comparison between a previous video image and a current video image to the microcomputer 45 as the sensing signal. Alternatively, the image sensor 43 may receive the video signal from the video processing part 20, compare current video data with previous video data in the unit of a frame, and output a result of the comparison to determine whether or not there exists data values common to both the current video data and the previous video data to the microcomputer 45 as the sensing signal.

Figure 3A:
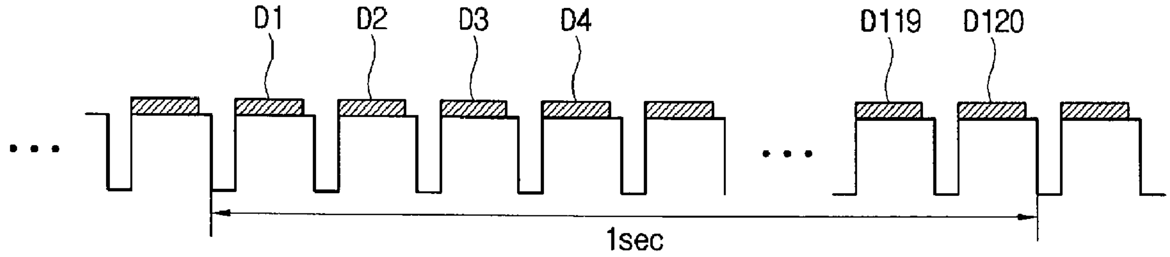
FIGS. 3A and 3B are exemplary views illustrating a signal with a vertical frequency depending on whether or not an after-image removal function is performed in the display apparatus according to an embodiment of the present general inventive concept.

The microcomputer 45 controls the video processing part 20 to perform a general operation of displaying the video image according to the video signal input to the video processing part 20 on the display panel 12. Then, the scaler 30 of the video processing part 20 sequentially and repeatedly performs an operation of storing the input video signal in the frame buffer 36 in the unit of a frame, reading stored video frames from the frame buffer 36, and outputting the read video frames to the panel driver 11. For example, when a display system has a vertical frequency of 120 Hz, the video processing part 20 outputs 120 video frames to the panel driver 11 for one second, as illustrated in FIG. 3A. In this figure, reference numerals D1, D2, D3, D4, . . . , D119 and D120 denote video data loaded on video frames.

If the after-image removal function is set to be in an on-state through a toggle key manipulation of the user input part 50, the microcomputer 45 memorizes the set on-state of the after-image removal function. If a display of the user UI menu is selected through the user input part 50, the microcomputer 45 controls the scaler 30 and the OSD generator 32 to display the user UI menu. If the after-image removal function is set to be in an on-state from the user UI menu through the user input part 50, the microcomputer 45 may memorize the set on-state of the after-image removal function. Accordingly, based on the on and/or off-state of the pre-stored after-image removal function, the microcomputer 45 may enable the image sensor 43 if only the after-image removal function is set to be in the on-state.

Based on a result of the sensing from the image sensor 43, if a predetermined period of time elapses under a condition where a ratio of a stationary area of the displayed video image to an overall area of the previous video image exceeds a predetermined ratio (for example, is 80%), the microcomputer 45 determines that the displayed video image is a still image. The predetermined ratio may be lower than 80%. Alternatively, based on a result of the sensing of the image sensor 43, if a predetermined period of time elapses under a condition where a predetermined area of the previous video image has the same data values as an area of the displayed video image which corresponds to the predetermined area, the microcomputer 45 may determine that the displayed video image is a still image.

If it is determined that the video image displayed on the display panel 12 is the still image, the microcomputer 45 can control the video processing part 20 to perform an operation of alternately displaying the video image according to the input video signal and the after-image prevention image generated in the pattern generator 34 on the display panel 12. That is, the microcomputer 45 can control the video processing part 20 to alternate between an operation of outputting the video frames according to the input video signal to the panel driver 11 by the predetermined number of times and an operation of outputting the after-image prevention frame corresponding to the after-image prevention image to the panel driver 11 by the predetermined number of times.

Each of the predetermined number of times by which the video frames are output to the panel driver 11 and the predetermined number of times by which the after-image prevention frame is output to the panel driver 11 may be one.

Figure 3B:
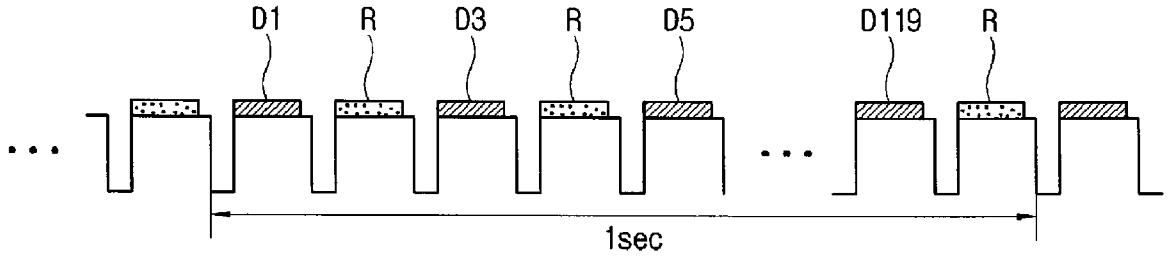

If it is determined that the video image displayed on the display panel 12 is the still image, the microcomputer 45 controls the video processing part 20 to repeatedly perform an operation of alternately outputting one of odd-numbered video frames and even-numbered video frames of the video frames sequentially stored in the frame buffer 36 and the after-image prevention frame generated in the pattern generator 34 to the panel driver 11. For example, if the display apparatus of the present general inventive concept supports a display system having a vertical frequency of 120 Hz, when outputting 120 video frames to the panel driver 11 for one second, the video processing part 20 alternately outputs odd-numbered video frames D1, D3, D5, . . . , D119 corresponding to video data according to the input video signal and the after-image prevention frame of data R corresponding to the after-image prevention image to the panel driver 11, as illustrated in FIG. 3B. Of course, the video processing part 20 may alternately output even-numbered video frames D2, D4, . . . , D120 and the after-image prevention frame of data R corresponding to the after-image prevention image to the panel driver 11. The data R may be black data corresponding to a black video image or data corresponding to a color image.

In this manner, alternately displaying the video image and the after-image prevention image (black video image) has an after-image prevention effect superior to minutely adjusting (in other words, fine tuning) the still image to prevent the after-image. On the other hand, if display time taken to display the after-image prevention image instead of the video image on the display panel 12 is long, there is a possibility that a user visually perceives the after-image prevention image. Accordingly, in the display apparatus of the present general inventive concept, the number of video frames of the video image displayed on the display panel 12 for one second can be maintained such that the user cannot perceive flickers visually. For example, as mentioned earlier, assuming that the display apparatus of the present general inventive concept supports the display system having the vertical frequency of 120 Hz, since 60 video frames of 120 video frames and 60 after-image prevention frames are output to the panel driver 11 for one second, the user will not perceive the alternation between the video image and the after-image prevention image visually. Accordingly, the video processing part 20 in the display apparatus of the present general inventive concept can support a display system having a vertical frequency of more than 120 Hz.

If the video image displayed on the display panel 12 is the still image in the display apparatus of the present general inventive concept, the after-image prevention frames are provided to the panel driver 11, instead of one of the odd-numbered video frames and the even-numbered video frames of the total of 120 video frames according the vertical frequency.

Accordingly, the display apparatus of the present general inventive concept can prevent the after-image effect very effectively so that a user does not perceive visually the after-image remaining after the still image is displayed.

While it is illustrated in this embodiment that the video image of one video frame according to the input video signal and the after-image prevention image of one after-image prevention frame are repeatedly and alternately displayed, the video image of a plurality (for example, 3) of video frames according to the input video signal and the after-image prevention image of one after-image prevention frame may be repeatedly and alternately displayed.

Figure 2:
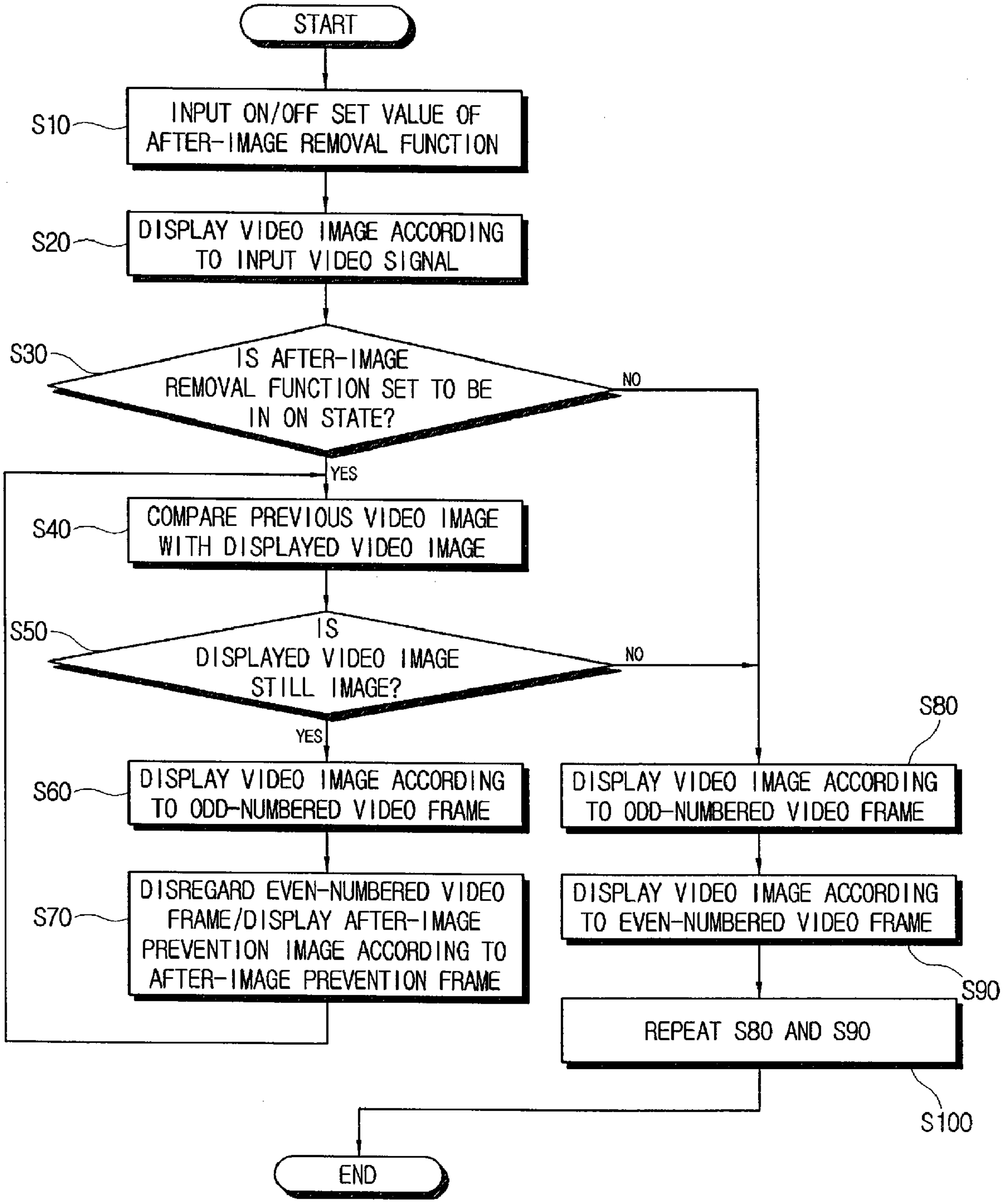
FIG. 2 is a control flow chart illustrating the display apparatus according to an embodiment of the present general inventive concept.

Hereinafter, a control flow chart of the display apparatus according to the above-described embodiment of the present general inventive concept will be described with reference to FIG. 2.

At operation S10, the microcomputer 45 determines whether or not a key signal to set a after-image removal function into an on or off state is input thereto through the user input part 50, and, if the after-image removal function is set to be in the on-state, stores the set on-state of the after-image removal function. At operation S20, the microcomputer 45 controls the video processing part 20 to perform a general operation of displaying a video image according to a video signal input to the video processing part 20 on the display panel 12. In other words, under control of the microcomputer 45, the scaler 30 of the video processing part 20 sequentially and repeatedly performs operations of storing the input video signal in the frame buffer 36 in the unit of frame, reading stored video frames from the frame buffer 36, and outputting the read video frames to the panel driver 11. Specifically, the scaler 30 outputs odd-numbered video frames D1, D3, D5, . . . , D119 and even-numbered video frames D2, D4, . . . , D120 corresponding to video data according to the input video signal to the panel driver 11 in a sequential manner. Accordingly, a moving picture according to the input video signal is displayed on the display panel 12.

At operation S30, based on the pre-stored on/off-state of the after-image removal function, the microcomputer 45 determines whether or not the after-image removal function is set to be in the on-state. If it is determined that the after-image removal function is set to be in the on-state, the microcomputer 45 enables the image sensor 43 to output a result of a comparison of a previous video image with a current video image to the microcomputer 45 as a sensing signal at operation S40. Based on the sensing signal input from the image sensor 43, the microcomputer 45 determines whether or not a displayed video image is a still image at operation S50. If it is determined that the displayed video image is the still image, the microcomputer 45 controls the video processing part 20 to repeatedly perform an operation of alternately outputting one of the odd-numbered video frames and the even-numbered video frames of the video frames sequentially stored in the frame buffer 36 and the after-image prevention frames generated in the pattern generator 34 to the panel driver 11 at operations S60, S70, S40 and S50.

Figure 4:
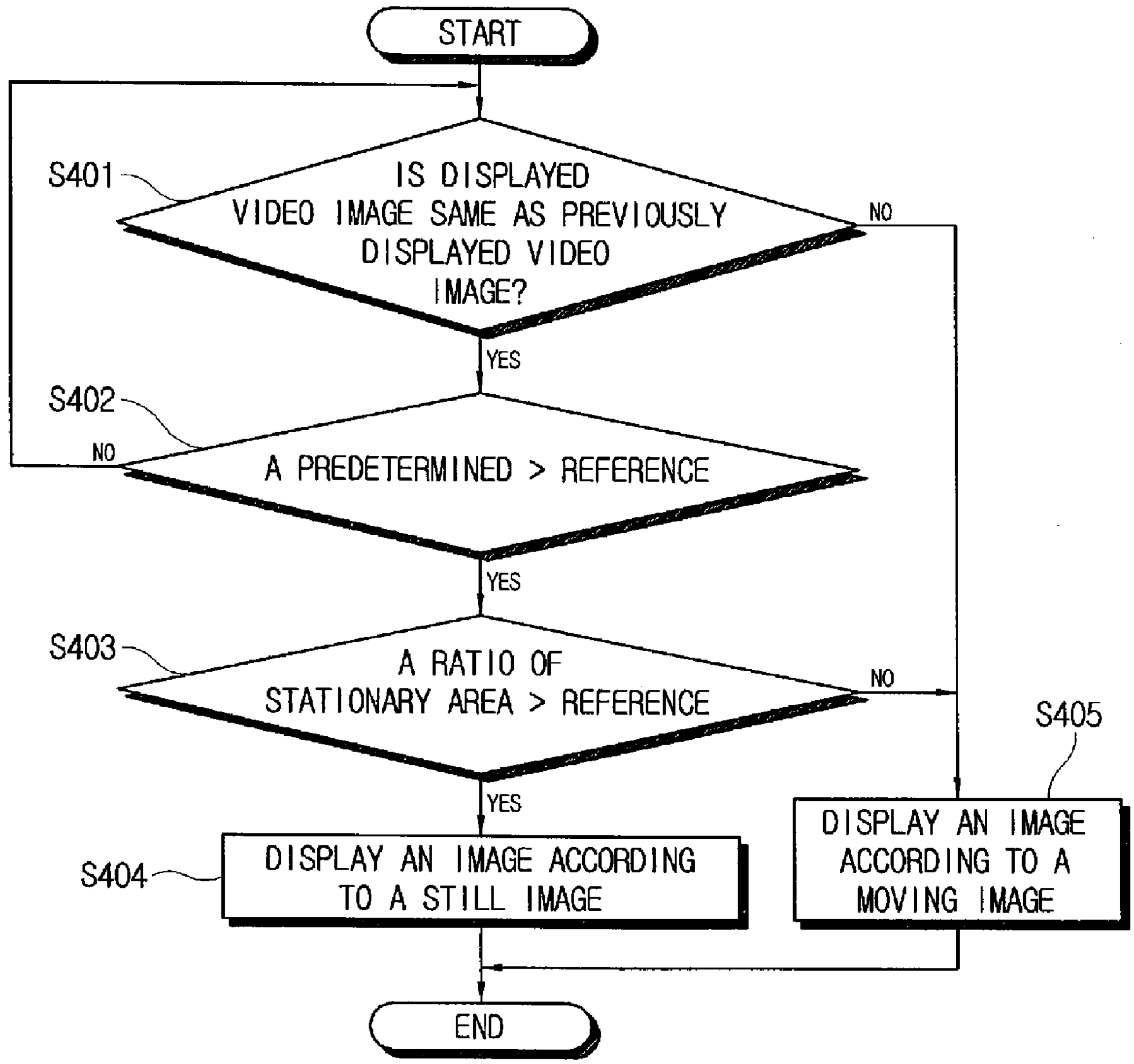
FIG. 4 is a control flow chart illustrating the method of comparing a previous video image with a displayed video image according to an embodiment of the present general inventive concept.

FIG. 4 illustrates a method of comparing a previous video image with a displayed video image according to an embodiment of the present general inventive concept. Operation S401 determines if the displayed video image is the same as the previous video image. If the displayed video image is not the same as the previous video image, an image is displayed according to a moving image in operation S405. If the displayed video image is the same as the previous video image, a comparison between a predetermined area and a reference is made in operation S402. If the predetermined area is less than the reference, then operation S401 is repeated. If the predetermined area is greater than the reference, a comparison is made between a ratio of a stationary area and a reference. If the ratio of a stationary area is less than a reference, operation S405 commences. If the ratio of a stationary area is greater than a reference, an image according to a still image is displayed in operation S404.

If it is determined that the displayed video image is the still image under control of the microcomputer 45, the scaler 30 of the video processing part 20 outputs a first odd-numbered video frame D1 stored in the frame buffer 36 according to the input video signal to the panel driver 11 to display a video image according to the first odd-numbered video frame D1 on the display panel 12 at operation S60. Next, the scaler 30 disregards a first even-numbered video frame D2 stored next to the first odd-numbered video frame D1 in the frame buffer 36 according to the input video signal and outputs an after-image prevention frame R generated in the pattern generator 34 to the panel driver 11 to display an after-image prevention image according to the after-image prevention frame R on the display panel 12 at operation S70.

The image sensor 43 continues to output the comparison result to the microcomputer 45 as the sensing signal, and, based on a result of the sensing of the image sensor 43, the microcomputer 45 continues to determine whether or not the displayed video image is the still image at operation S50. Then, the scaler 30 outputs a second odd-numbered video frame D3 stored in the frame buffer 36 according to the input video signal to the panel driver 11 to display a video image according to the second odd-numbered video frame D3 on the display panel 12 at operation S60. The scaler 30 disregards a second even-numbered video frame D4 stored next to the second odd-numbered video frame D3 in the frame buffer 36 according to the input video signal and outputs the after-image prevention frame R generated in the pattern generator 34 to the panel driver 11 to display the after-image prevention image according to the after-image prevention frame R on the display panel 12 at operation S70. The scaler 30 repeatedly performs operations S60 and S70 of alternately outputting the odd-numbered video frames and the after-image prevention frame R to the panel driver 11, for example, 60 times for one second, thus outputting 120 frames to the panel driver 11 for one second.

Here, if it is determined at operation S30 or S50 that the after-image removal function is set to be in the off state or the displayed video image is not the still image, the microcomputer 45 controls the video processing part 20 as in operation S80. Specifically, under control of the microcomputer 45, the scaler 30 of the video processing part 20 outputs the first odd-numbered video frame D1 stored in the frame buffer 36 according to the input video signal to the panel driver 11 to display the video image according to the first odd-numbered video frame D1 on the display panel 12 at operation S80. The scaler 30 outputs the first even-numbered frame D2 stored next to the first odd-numbered video frame D1 sequentially stored in the frame buffer 36 according to the input video signal to the panel driver 11 to display the video image according to the first even-numbered video frame D2 on the display panel 12 at operation S90. The scaler 30 continuously outputs the second odd-numbered video frame D3 stored in the frame buffer 36 according to the input video signal to the panel driver 11, and then outputs the second even-numbered video frame D4 to the panel driver 11. The scaler 30 repeatedly performs the operation of sequentially and alternately outputting the odd-numbered video frames D1, D3, D5, . . . , D119 and the even-numbered video frames D2, D4, . . . , D120 to the panel driver 11 at operation S100. Accordingly, a moving picture according to the input video signal is displayed on the display panel 12.

According to the display apparatus of the present general inventive concept and the control method thereof, if the video image displayed on the display panel 12 is the still image, one of the odd-numbered video frames and the even-numbered video frames of the total of 120 video frames according to the vertical frequency can be replaced with the after-image prevention frame to be provided to the panel driver 11. Accordingly, an after-image effect, which may occur when a still image is displayed, can be very effectively prevented so as not to be perceived by a user.

The present general inventive concept can also be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

As apparent from the description, the present general inventive concept provides a display apparatus which is capable of removing an after-image effect remaining on a display panel effectively, and a control method thereof.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A display apparatus having a displaying part, comprising:

a video processing part to process an input video signal into a format which can be displayed on the displaying part, the input video signal including video frames; and a controlling part to determine whether a video image displayed on the displaying part is a still image, and if it is determined that the video image is the still image, to control the video processing part to display an after-image prevention frame to alternately replace the video frames, the after-image prevention frame corresponding to an after-image prevention image.

2. The display apparatus according to claim 1, wherein the controlling part controls the video processing part to alternate between an operation of outputting the video frames according to the input video signal to the displaying part and an operation of outputting the after-image prevention frame corresponding to the after-image prevention image to the displaying part.

3. The display apparatus according to claim 1, wherein the controlling part comprises:

an image sensor to sense whether the video image displayed on the displaying part is stationary; and a microcomputer to determine that the displayed video image is the still image that is stationary for more than a predetermined period of time, based on a result of the sensing of the image sensor.

4. The display apparatus according to claim 3, wherein:

the video processing part comprises a frame buffer to store the video signal to be provided to the displaying part in a unit of frame; and the image sensor makes a comparison between the video frames sequentially stored in the frame buffer and outputs a result of comparison between the displayed video image and a previous video image, as a sensing signal.

5. The display apparatus according to claim 4, wherein, if the predetermined period of time elapses under a condition where a ratio of a stationary area of the displayed video image to an overall area of the previous video image exceeds a predetermined ratio, the microcomputer determines that the displayed video image is the still image.

6. The display apparatus according to claim 4, wherein, based on the sensing signal from the image sensor, if the predetermined period of time elapses under a condition where a predetermined area of the previous video image has the same data values as an area of the displayed video image which corresponds to the predetermined area, the microcomputer determines that the displayed video image is the still image.

7. The display apparatus according to claim 5, wherein the video processing part comprises:

a video signal processor to support a display system having a predetermined vertical frequency, and to sequentially and repeatedly perform operations of:

processing the input video signal into a format which can be displayed on the displaying part according to the predetermined vertical frequency, storing the processed video signal in the frame buffer in the unit of frame, reading the stored video frames from the frame buffer, and outputting the read video frames to the displaying part.

8. The display apparatus according to claim 7, wherein the video signal processor comprises:

a pattern generator to generate the after-image prevention frame corresponding to the after-image prevention image, and to repeatedly perform an operation of alternately outputting one of an odd-numbered video frame and an even-numbered video frame of the video frames sequentially stored in the frame buffer and the after-image prevention frame generated in the pattern generator to the displaying part.

9. The display apparatus according to claim 8, further comprising:

an after-image removal function selecting part to set at least one of on state and off state of an after-image removal function, wherein the controlling part stores at least one of on setting state and off setting state of the after-image removal function that is selected through the after-image removal function selecting part, and, if the after-image removal function is set to be in the on-state, determines whether the video image displayed on the displaying part is stationary.

10. The display apparatus according to claim 1, wherein the after-image prevention image is a black image.

11. The display apparatus according to claim 7, wherein the predetermined vertical frequency is 120 Hz.

12. A control method of a display apparatus having a displaying part, comprising:

displaying a video image according to an input video signal on the displaying part, the input video including video frames;

determining whether the displayed video image is a still image; and displaying a predetermined after-image prevention image on the displaying part to alternately replace the video frames when the displayed video image is a still image.

13. The control method according to claim 12, wherein the displaying the video image and the after-image prevention image comprises:

outputting alternately between an operation of outputting the video frames according to the input video signal to the displaying part; and outputting an after-image prevention frame corresponding to the after-image prevention image to the displaying part.

14. The control method according to claim 12, wherein the displaying the video image according to the input video signal on the displaying part comprises:

sequentially and repeatedly performing operations of processing the input video signal into a format which can be displayed on the displaying part;

storing the processed video signal in a frame buffer in the unit of frame;

reading the stored video frames from the frame buffer;

and outputting the read video frames to the displaying part.

15. The control method according to claim 12, wherein the determining whether the displayed video image is the still image comprises:

comparing the displayed video image with a previous video image based on the video frames sequentially stored in the frame buffer.

16. The control method according to claim 12, wherein the displaying the video image and the after-image prevention image comprises:

outputting alternately between an operation of outputting one of an odd-numbered video frame and an even-numbered video frame of the video frames sequentially stored in the frame buffer to the displaying part and an operation of outputting the after-image prevention frame corresponding to the after-image prevention image to the displaying part one time.

17. The control method according to claim 16, wherein the after-image prevention image is a black image.

18. The control method according to claim 12, further comprising:

receiving at least one of on set value and offset value of the after-image removal function, wherein the determining whether the displayed video image is the still image comprises determining whether the displayed video image is stationary, if the after-image removal function is set to be in an on-state, based on the received at least one of on set value and offset value.

19. A display apparatus having a displaying part, comprising:

a controlling part to compare video frames of a video image and to determine whether a displayed video image is a still image according to the compared video frames; and a video processing part to display at least one after-image prevention image frame to replace at least one of the video frames of the video image respectively together with one or more un-replaced video frames of the video image according to the determination of the controlling part on the displaying part.

20. The display apparatus of claim 19, wherein the video frames comprise a first frame and a second frame, and the controlling part controls the video processing part to output the after-image prevention image frame to replace one of the first frame and the second frame and to output un-replaced one of the first frame and the second frame as a video image to be displayed.

21. The display apparatus of claim 19, wherein the controlling part determines the still image if a ratio of a stationary area of the displayed video image to an overall area of the previous video image exceeds a reference.

22. A method of determining a displayed image on a display apparatus is stationary to prevent an after-image effect, comprising:

comparing video frames of a video image to generate a sensing signal;

determining whether a displayed video image is a still image; and outputting at least one after-image prevention image frame to replace at least one of the video frames of the vide image respectively together with one or more un-replaced video frames of the video image according to the determination.

23. The method of claim 22, wherein the at least one after-image prevention image frame comprises a black video image.

24. The method of claim 22, wherein the determining of the still image comprises determining whether a ratio of the stationary area of the current video image to the overall area of the previous video image exceeds a reference after a predetermined period of time.

25. A method of controlling a display apparatus, comprising:

determining whether a video image is a still image based on video frames of the video image; and if the video image is determined to be a still image, updating the video image by replacing at least one of the video frames with respective at least one after-image prevention image frame and maintaining least on un-replaced frame of the video frames and displaying the updated video image.

26. A method of claim 25, wherein a number of the video frames in the video image before the updating is same as a number of the video frames in the updated video image.

27. A method of claim 25, wherein the updating comprises:

identifying odd-numbered frames of the video frames and even-numbered frames of the video frames; and replacing the even-numbered frames or the odd-numbered frames of the video frames with the respective at least one after-image prevention image frame having a plurality of after-image prevention image frames.

28. A method of claim 25, further comprising:

performing motion compensation in the video frames of the video image by inserting compensating frames between the video frames.

* * * * *